Sept. 25, 1945.  D. F. WARNER  2,385,664
CABIN SUPERCHARGER ARRANGEMENTS
Filed Aug. 19, 1941  2 Sheets-Sheet 1
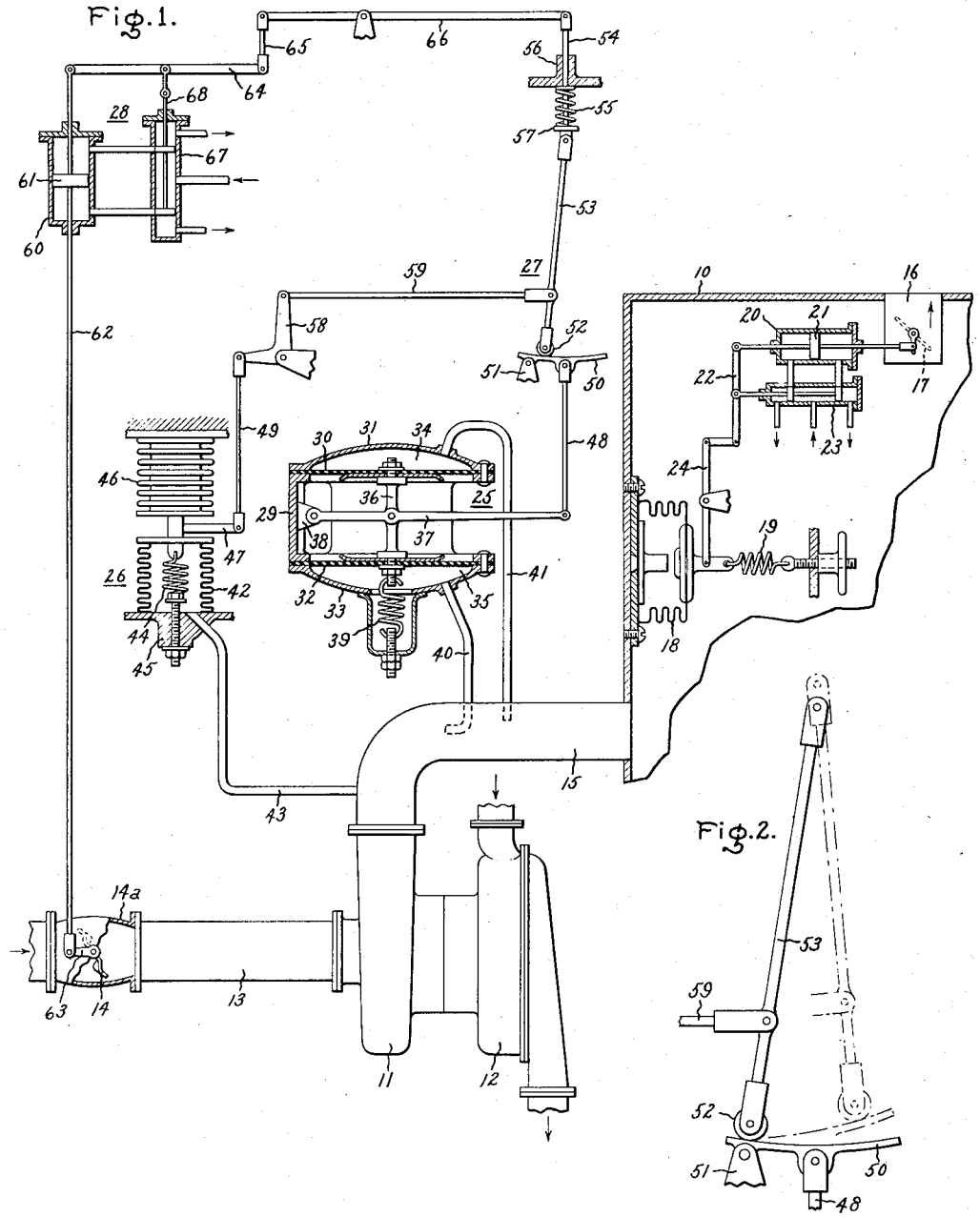
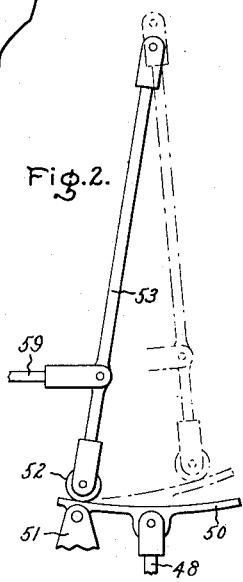
Inventor:
Donald F. Warner,
by Harry E. Dunham
His Attorney.

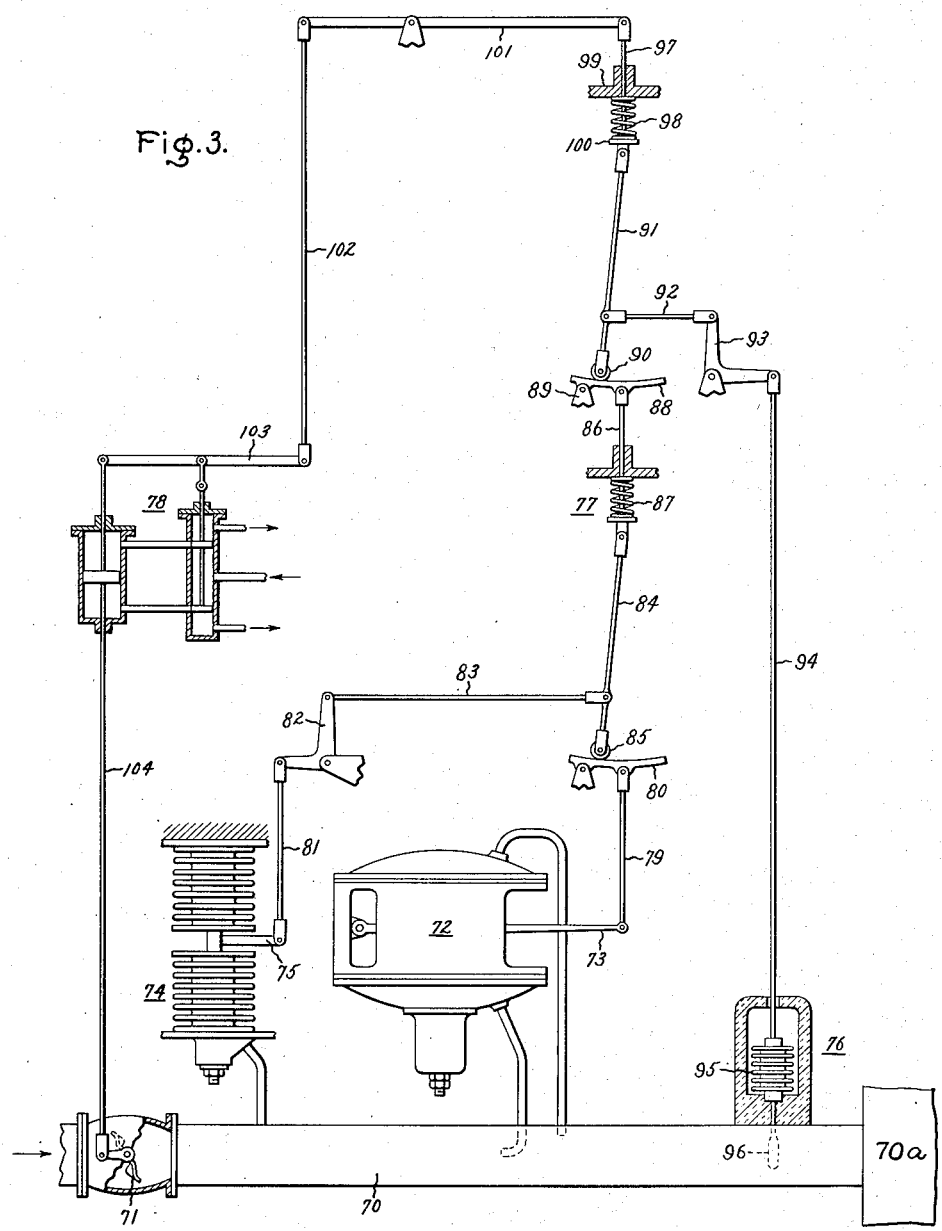

Patented Sept. 25, 1945

2,385,664

UNITED STATES PATENT OFFICE 2,385,664

CABIN SUPERCHARGER ARRANGEMENTS

Donald F. Warner, Swampscott, Mass., assignor to General Electric Company, a corporation of New York Application August 19, 1941, Serial No. 407,443

1 Claim. (Cl. 137—153)

The present invention relates to cabin supercharger arrangements such as are used on aircraft including a pump or blower, preferably a centrifugal type compressor, for supplying air under pressure to a cabin or like consumer. In order to maintain comfortable conditions in a passenger cabin it is necessary to provide a compressor for forcing air into the cabin together with means for controlling the compressor to maintain substantially constant pressure in the cabin and to provide for substantially constant circulation of air therethrough.

The object of my invention is to provide an improved construction and arrangement of cabin superchargers and mechanism for controlling them.

For a consideration of what I believe to be novel and my invention, attention is directed to the following description and the claim appended thereto in connection with the accompanying drawings.

In the drawings, Fig. 1 illustrates a cabin supercharger arrangement embodying my invention; Fig. 2 is an enlarged view of a part of Fig. 1 in different operating positions; and Fig. 3 illustrates a modification according to my invention.

The requirement for the maintenance of substantially uniform conditions in an aircraft cabin is accomplished in accordance with my invention by the provision of a supercharger and a mechanism for controlling it to deliver a substantially constant weight of air per minute to the cabin. The weight of air delivered by a compressor is a function of the flow, pressure and temperature of the air in the compressor discharge conduit. A cabin supercharger control mechanism according to my invention accordingly includes means responsive to changes of these variables of flow, pressure and temperature. In certain instances changes of the temperature may be neglected and the compressor may be controlled by a mechanism responsive to changes of the product of flow and pressure only in the compressor discharge conduit. The output of the compressor may be varied in known manner either by varying its speed or by the provision of a throttle valve in one of its inlet and outlet conduits.

Referring now to Fig. 1, in which I have shown a mechanism of the type just described, the arrangement includes a cabin 10 which may be a passenger cabin on an aircraft and which broadly constitutes a consumer for air or like medium under pressure. Air under pressure is supplied to the cabin 10 by a centrifugal compressor 11 driven by a power agency such as a turbine 12. The compressor 11 has an inlet conduit 13 with a control valve 14 and a discharge conduit 15 connected to the cabin 10.

The leading and trailing edge portions of the valve member 14 are bent in order to produce substantially equal flow conditions near the leading and trailing portions of the valve member and thereby to reduce the valve reactions especially near closing position of the valve. In addition, the valve is contained in a casing 14a which is barrel-shaped having a cross-sectional area which increases gradually from the inlet of the casing 14 towards a vertical plane through the valve support and thereafter decreases towards the outlet of the casing. With an arrangement of this kind the rate of opening near the cracking point of the valve per increment of the angular displacement of the valve member becomes such as to provide substantially uniform stability throughout the range of operation and in addition this arrangement reduces the reactions of the valve member against movement over a long range of opening travel. The cabin has a discharge conduit 16 through which air is discharged into the atmosphere, the discharge being controlled by a butterfly valve 17 in the conduit 16. The control of the valve 17 is effected automatically by means responsive to changes of the absolute pressure in the cabin 10. This means includes an evacuated bellows 18 shown supported on a wall of the cabin 10 and biased towards the right, that is, against collapsing, by means of an adjustable tension spring 19. Changes in cabin pressure effect movement of the bellows, an increase in pressure causing collapsing of the bellows and a decrease in pressure causing expansion thereof. Movement of the bellows is transmitted to the valve 17 by means of a hydraulic motor 20 having a piston 21 with a stem connected at one end to an arm of the valve 17 and at the other end to a floating and follow-up lever 22. The latter has an intermediate point pivotally connected to a pilot valve 23 for controlling the motor 20 and another point pivotally linked to one end of a fulcrumed lever 24 having another end connected to the bellows or absolute pressure responsive device 18.

An increase in cabin pressure effecting collapsing movement of the bellows 18 causes clockwise turning movement of the lever 24 about its fulcrum whereby the upper end of the lever 22 moves the pilot valve 23 to the right to admit fluid to the right-hand end of the motor 20 and to discharge fluid from the left-hand end of the motor 20. Under this condition the piston 21 of the motor is moved to the left, causing opening movement of the valve 17 and turning movement of the lever 22 to restore the pilot valve to its original position. Similarly, a drop in cabin pressure causes expansion of the bellows and, through the hydraulic motor, closing movement of the valve 17, thereby reducing the discharge of air from the cabin and maintaining substantially constant cabin pressure.

In the present example the operation of the compressor or blower 11 is controlled by a mechanism for positioning the valve 14 in response to changes of the product of flow and absolute pressure in the discharge conduit 15. This mechanism broadly comprises a device 25 responsive to variations of flow in the conduit 15 and another device 26 responsive to pressure changes, more specifically to absolute pressure changes in the conduit 15, and a link and lever mechanism 27 connected to the devices 25 and 26 to form a product of the two variables and to transmit changes of the product to the valve 14 by means including a hydraulic motor 28.

The flow responsive device 25 comprises a cylinder 29 with open side walls and flanged end portions. A diaphragm 30 and a curved end plate 31 are attached to the upper end of the cylinder, and a diaphragm 32 and a curved cover 33 are attached to the lower end of the cylinder, thus forming chambers 34 and 35 respectively. Central portions of the diaphragms 30, 32 are rigidly secured to the ends of a strut or rod 36 which has a central portion pivotally connected to an intermediate point of a lever 37, the left-hand end of which is pivoted to a fulcrum 38. The diaphragms are biased downward by an adjustable tension spring 39 connected to the lower end of the rod 36. The chamber 35 is connected to the end of an impact tube 40 having another end located within the inlet conduit 15 and the chamber 34 is connected to one end of a pressure tube 41 having another end connecting with the conduit 15. With this arrangement an increase in flow in the conduit 15 causes upward movement of the right-hand end of the lever 37 and, vice-versa, a decrease in flow in the conduit 15 causes downward movement of the right-hand end of the lever 37.

The absolute pressure responsive device 26 is of known design comprising a bellows 42 communicating through a tube 43 with the conduit 15 and biased against expansion by an adjustable tension spring 44. The lower end of the bellows is secured to a fixed support 45 and an upper end plate of the bellows is connected to the lower end plate of an evacuated bellows 46 having an upper end held on a fixed support. Adjacent portions of the bellows are rigidly connected to a lateral extension or lever 47. During operation an increase in pressure in the conduit 15 causes upward movement of the lever 47 and, vice-versa, a decrease in absolute pressure in the conduit 15 causes downward movement of the lever 47. Similarly, a decrease in absolute pressure in the conduit 15 causes downward movement of the lever or extension 47.

The link and lever mechanism 27 for forming a product of the movements of the right-hand ends of the levers 37 and 47 of the devices 25 and 26 respectively comprises vertical links 48 and 49 having lower ends pivotally connected to the right-hand ends of the levers 37 and 47 respectively. The upper end of the link 48 is pivotally connected to a curved lever 50 which has a left-hand portion held on a fulcrum 51. The upper surface of the lever is engaged by a roller or like means 52 held at the lower end of a link 53. The upper end of the link 53 is pivotally connected to the lower end of a rod 54 biased downward by a compression spring 55 held between a fixed support 56 and a spring plate 57 secured to the rod 54. The spring 55 thus acts to maintain engagement between the roller 52 and the curved lever 50, and thus eliminates lost motion.

The upper end of the link 49 is connected to one arm of a bellcrank lever 58, the other arm of which is pivotally connected by a link 59 to an intermediate point of the link 53. The lever 50 has an inner circular cylindrical surface engaging the roller 52 and the radius of the cylindrical surface is equal to the length of the link 53 with the roller 52. In the position shown in Fig. 1, the lever 50 is in zero position in which the center of its upper cylindrical surface coincides with the upper end or pivot of the link 53 or, from another viewpoint, in which the centerline of the link 53 coincides with a radius of the upper curved surface of the lever 50. In this position movement of the link 53 to the right by action of the pressure responsive device 26 does not cause movement of the rod 54; the link 53 under this condition merely rotates about its upper pivotal connection with the rod 54. The length of the link 53 from the center of its upper pivot to the lower edge of the roller 52 is substantially equal to the radius of curvature of the lever 50. When the pressure registered by the absolute pressure responsive device 26 is zero the roller 52 must stand radially over the fulcrum 51 and when the pressure difference as registered by the differential pressure responsive device 25 is zero the lever 50 must be in the position indicated in full lines in Figs. 1 and 2 in which the center of its circular cylindrical surface coincides with the center of the upper pivot of the link 53.

In Fig. 2, the mechanism is shown enlarged with both the lever 50 and the link 53 shown in full lines in zero positions and in dash-dotted lines in other positions. The link 53 is in its zero position in which its centerline coincides with the line connecting the upper pivot of the link 53 with the center of the pivot or fulcrum 51. In this position turning movement of the lever 50 about its fulcrum does not cause movement of the rod 54. Considering the mechanism in the position shown in dash-dotted lines in Fig. 2, it will be noted that turning movement of either the lever 50 or movement of the link 53 by the link 59 causes vertical movement of the upper pivot of the link 53 and of accordingly the rod 54 (Fig. 1). The vertical movement of the rod 54 is proportional to the product of the movements of the aforementioned levers 26 and 37 or the product of the movement of the links 59 and 48. If, for example, the lever 50 is moved up one-eighth of an inch, such movement in an intermediate position of the link 53 may cause upward movement of the rod 54 of one-sixteenth of an inch. If now the lever 50 is moved upward three times the aforementioned amount, then the rod 54 also will be moved upward three times the amount it has been moved before.

The upper end of the rod 54 is connected to the valve 14 through the hydraulic motor 28. More specifically the motor 28 includes a cylinder 60 with a piston 61 movably disposed therein and connected to a rod 62 which at its lower end is connected to an arm 63 of the valve 14 and at its upper end is connected to the left-hand end of a floating lever 64, the right-hand end of which is pivotally connected by a link 65 to the left-hand end of a fulcrumed lever 66 which latter has a right-hand end pivotally connected to the upper end of the rod 54. The supply and discharge of fluid under pressure to the cylinder 60 is controlled by a pilot valve 67 which has a stem 68 pivotally connected to an intermediate point of the floating lever 64. During operation, upward movement of the rod 54 causes counterclockwise turning movement of the fulcrumed lever 66, which latter thereby forces the right-hand end of the lever 64 downward, displacing the valve heads of the pilot valve and causing fluid under pressure to be supplied to the lower end of the cylinder 60 and discharged from the upper end thereof, resulting in upward movement of the piston 61 and accordingly closing movement of the valve 14. Similarly, downward movement of the rod 54 causes through the hydraulic motor 28 opening movement of the valve 14.

The operation of the arrangement as a whole is as follows: Assuming the mechanism is in a balanced condition with the elements 50, 53 in the position shown in dash-dotted lines in Fig. 2; if now the pressure in the conduit 15 drops, the lever 47 of the pressure responsive device 26 is forced downward, thereby causing movement of the horizontal link 59 towards the left. The vertical link 53 thereby is turned towards the left and its upper end forced downward by the action of the spring 55, resulting in downward movement of the rod 54 and opening movement of the valve 14. Similarly, with an increase in pressure in the conduit 15 the control mechanism effects closing movement of the valve 14.

Assuming now that the pressure in the conduit 15 remains constant and the flow therethrough decreases; this causes, through the flow responsive device 25, downward movement of the right-hand end of the lever 37 and of the link 48, whereby the lever 50 is turned counterclockwise about its fulcrum 51. Such movement causes lowering of the link 53 and accordingly downward movement of the rod 54, resulting in opening movement of the valve 14. Similarly, with an increase in flow through the conduit 15 at constant pressure therein the control mechanism effects closing of the valve 14. Thus, assuming that the temperature of the air in conduit 15 remains substantially constant, the mechanism described above controls the compresssor to supply a constant weight of air per minute to the cabin. In other words, with my mechanism the weight flow of air per minute or the rate of weight flow of air to the cabin or consumer for air or like medium under pressure is maintained substantially constant.

In the arrangement of Fig. 3, I have shown a mechanism for controlling a compressor in response to changes of the product of flow, pressure, as well as temperature of air or like medium discharged from the compressor. The arrangement comprises a conduit 70 corresponding to the conduit 15 in Fig. 1 for conducting air or like fluid under pressure to a cabin or like consumer 70a. The direction of flow through the conduit is indicated by an arrow. The flow may be varied by means of a butterfly valve 71 arranged near the inlet portion of the conduit 70. The control mechanism for positioning the valve 71 in response to changes of the product of flow, pressure and temperature of the air in the conduit 70 comprises a pressure responsive device 72, similar to the device 25 in Fig. 1 and including a lever 73, a pressure responsive device 74 corresponding to the device 26 in Fig. 1 and including a lever 75 corresponding to the lever 47 in Fig. 1 and a temperature responsive device 76. The three devices 72, 74, 76 are connected by a link and lever mechanism 77 to a hydraulic motor 78 corresponding to the motor 28 of Fig. 1 for positioning the valve 71.

The lever 73 of the flow responsive device 72 is connected by a link 79 to a fulcrumed curved lever 80 corresponding to the lever 50 of Fig. 1. The lever 75 is connected by a link 81 to a bellcrank lever 82 which in turn is connected by a link 83 to a link 84 with a roller 85 engaging the curved lever 80 and having an upper end pivotally connected to a rod 86 biased downward by a spring 87 to maintain engagement between the roller 85 and the curved lever 80. The link and lever mechanism so far described is the same as that shown in Fig. 1, the rod 86 corresponding to the rod 54 of Fig. 1. Whereas the rod 54 in Fig. 1 is connected to the hydraulic motor 28, in the present arrangement the rod 86 is connected to another curved lever 88 rotatably supported on a fulcrum 89 and engaging a roller 90 held at the lower end of a link 91. An intermediate point of the link 91 is connected by a link 92 to one arm of a bellcrank 93 which has another arm connected by a link 94 to the temperature responsive device 76. The latter has a bellows 95 enclosed in a heat-insulated chamber and connected to a sealed pipe 96 projecting into the conduit 70.

The upper end of the link 91 is pivotally connected to a rod 97 biased downward by a spring 98 held between a fixed support 99 and a collar 100 on the rod 97. The rod 97 is guided by the support or guide 99 and the upper end of the rod 97 is connected by a fulcrumed lever 101 and a link 102 to a floating lever 103 of the hydraulic motor 78. The latter has a piston with a stem 104 connected to the valve 71. The curved levers 80 and 88 have inner cylindrical surfaces of a radius equal to the lengths of the links 84 and 91 respectively. In their zero positions the centers of the surfaces of the levers 80 and 88 coincide with the center of the pivots at the upper ends of the links 84 and 91 respectively. The line through the center of the fulcrum 89 and the center of the cylindrical surface of the lever 88 constitutes a zero position for the rod 91. Likewise, the rod 84 is in a zero position when its center line coincides with the line through the center of the pivot at its upper end and the center of the fulcrum for the lever 80. As long as one of the elements 80, 84, 88 and 91 is in zero position, movement of another element will not effect setting of the valve 71.

Assuming that the various elements are in intermediate position, an increase in flow through the conduit 70 causes upward turning movement of the curved lever 80 which in turn effects upward movement of the rod 86 and the curved lever 88, resulting in upward movement of the link 91 and the rod 97 to effect closing movement of the valve 71. A decrease in flow causes the control mechanism to open the valve 71.

An increase in pressure in the conduit 70 causes upward movement of the lever 75 which in turn effects movement of the link 83 towards the right whereby the rod 87 is forced upward, causing upward movement of the link 91 and the rod 97 to cause closing of the valve 71.

An increase in temperature of the fluid contained in the conduit 70 causes expansion of the bellows 95 of the pressure responsive device, effecting upward movement of the link 94 and counterclockwise turning movement of the bellcrank 93 about its fulcrum, thus forcing the link 92 towards the left and causing counterclockwise turning movement of the link 91. Simultaneously the latter is forced downward to maintain engagement between the roller 90 and the lever 86, resulting in downward movement of the rod 87 and opening of the valve 71. Similarly, with a drop in temperature of the fluid in the conduit 70 the control mechanism effects closing of the valve 71. It will be noted that the temperature responsive device with the link 92 connected thereto acts upon the link 91 in the same manner as the pressure responsive device 74 with the link 53 connected thereto acts upon the link 84.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

The combination of a conduit for conducting a compressible medium, a control valve in the conduit, and a mechanism for controlling the control valve in response to changes of the product of the flow and the pressure of the compressible medium in the conduit, said mechanism including a fulcrumed lever having a circular cylindrical surface, a link with a roller connected to one end and engaging the circular surface, means pivotally connected to the other end of the link, the length of the link with the roller being substantially equal to the radius of the lever, a device responsive to pressure changes of the medium being pivotally connected to an intermediate point of the link, and another device responsive to changes of flow of the medium being pivotally connected to the lever.

DONALD F. WARNER.